United States Patent

Golov et al.

[11] Patent Number: 6,124,790
[45] Date of Patent: Sep. 26, 2000

[54] SYSTEM AND METHOD FOR FILTERING AN ALARM

[75] Inventors: Maxim A. Golov; Kirill R. Schmidt, both of Hilversum, Netherlands

[73] Assignee: Lucent Technologies Inc., Murray Hill, N.J.

[21] Appl. No.: 09/196,801

[22] Filed: Nov. 20, 1998

[51] Int. Cl.[7] .................................................. G08B 29/00
[52] U.S. Cl. ........................ 340/508; 340/500; 340/501; 340/511
[58] Field of Search ..................................... 340/508, 500, 340/511, 501, 507, 526, 565, 566

[56] References Cited

U.S. PATENT DOCUMENTS

| | | | |
|---|---|---|---|
| 4,543,567 | 9/1985 | Shirata et al. ........................... | 340/519 |
| 5,155,468 | 10/1992 | Stanley et al. ........................... | 340/501 |
| 5,233,329 | 8/1993 | Lippmann et al. ....................... | 340/438 |
| 5,309,147 | 5/1994 | Lee et al. ................................. | 340/567 |
| 5,329,173 | 7/1994 | Murakami et al. ...................... | 307/355 |
| 5,444,431 | 8/1995 | Kenny ...................................... | 340/541 |

*Primary Examiner*—Donnie L. Crosland

[57] ABSTRACT

A method for filtering an alarm can be broadly summarized by the following steps: The state of an alarm is read or determined over time, which creates a pattern of state transitions for the alarm. The pattern of state transitions for the alarm are integrated to produce a second alarm having a second pattern of state transitions. State transitions for the second alarm are controlled by using a pair of hysteresis threshold values to filter out redundant alarm state transitions that do not convey useful or necessary fault information.

14 Claims, 10 Drawing Sheets

SYSTEM AND METHOD FOR FILTERING AN ALARM

BACKGROUND OF THE INVENTION

The present invention relates generally to the field of fault management, and, more particularly, to a system and method for filtering redundant alarm messages or alarm state transitions that do not convey useful or necessary fault information.

Communication networks being comprised of a complex combination of electronic hardware systems and software programs can be vulnerable to faults in equipment and transport media. A fault can generally be defined as a persistent condition in a component (e.g., hardware and/or software) that prevents the component from performing its function. These faults include hardware malfunctions as well as program and data errors. To cope with these faults or failure events when they occur, communication networks include a fault management subsystem that is responsible for the preservation and restoration of service in the presence of faults.

One aspect of fault management is known as alarm surveillance. An alarm is an adverse event that signifies a detected failure or fault in some aspect of the communication network. The alarm may be brought to the attention of a person responsible for taking remedial action, or may trigger an automated diagnostic or maintenance capability to run a test on the faulty component or take the faulty component out of service. Alternatively, the alarm may be simply recorded for analysis at a later time.

Alarms can be used to signal a variety of types of failure events. For example, one classification of failure events is known as functional failure events. These types of faults are specific to an externally visible feature and include such examples as loss of a line signal and protocol errors between two units remote from one another. A second classification of failure events corresponds to hardware faults, which are generally detected by specific circuit checks. A third classification of failure events corresponds to software faults. Examples of software faults include detection of illegal commands, process time outs due to lack of response from another process or unit, audit errors due to database inconsistencies, and assertions resulting from defensive program checks.

Alarm messages are processed by the fault management subsystem in two ways: The first way is referred to as alarm correlation and has the goal of identifying the root cause of each fault. The second way is referred to as alarm validation and has the goal of ensuring that the alarm message truly indicates some fault in the system. At first, it would seem that alarm validation should be straightforward. That is, when an alarm message is received, the alarm is automatically correlated by running some type of diagnostic on the component that triggered the alarm. While this approach is thorough in ensuring that any fault generating component is immediately attended to, it is also highly inefficient. Components frequently incur faults of a sporadic nature that while they may be worthy of review at some point in time, they do not require immediate attention. If affirmative action is taken for every alarm message in a complex communication network, the performance of the network could be severely degraded as processor time becomes dominated with diagnostic and maintenance activity. Moreover, critical faults could be overshadowed by large numbers of redundant alarms.

As part of alarm validation, faults are typically divided into three groups according to their duration: permanent, intermittent, and transient. Permanent faults are those faults that exist in the system until some remedial action is taken. Intermittent faults are those faults that occur in a discontinuous and periodic way causing service degradation or interruption as a result. Transient faults are those faults that momentarily cause a minor degradation in service. Permanent faults typically do not generate an abundance of redundant alarm messages and are therefore relatively easy to validate. On the other hand, intermittent and transient faults can generate numerous alarm messages, many of which are redundant and should be ignored. In addition, intermittent and transient faults may generate a small number of alarm messages indicating only a minor service interruption that does not require any diagnostic or maintenance attention.

Accordingly, what is sought is an improved system and method for validating intermittent and transient alarms that filters out redundant alarm messages or alarm state transitions that do not convey useful or necessary fault information to thereby improve overall system performance.

SUMMARY OF THE INVENTION

Certain advantages and novel features of the invention will be set forth in the description that follows and will become apparent to those skilled in the art upon examination of the following or may be learned with the practice of the invention.

To achieve the advantages and novel features, the present invention is generally directed to a method for filtering an alarm, which can be broadly summarized by the following steps: The state of an alarm is read or determined over time, which creates a pattern of state transitions for the alarm. The pattern of state transitions for the alarm are integrated to produce a second alarm having a second pattern of state transitions. State transitions for the second alarm are controlled by using a pair of hysteresis threshold values to filter out redundant alarm state transitions that do not convey useful or necessary fault information.

The invention can also be viewed as providing an alarm management system. In this regard, the system includes a processor and a storage medium that contains program code. The program includes first logic that is configured to read or determine the state of an alarm, which, over time, creates a pattern of state transitions. In addition, the program includes second logic that is configured to integrate the pattern of state transitions to produce a second alarm. A first code segment in the second logic controls the state transitions for the second alarm by using a pair of hysteresis threshold values to filter out redundant alarm state transitions that do not convey useful or necessary fault information.

The alarm filtering system and method of the present invention can be used to improve the performance of systems, such as telecommunication networks, which must process a large number of alarms from many different types of equipment or software modules. Frequently, these systems can be overloaded by a flood of alarm messages or alarm state transitions, many of which are redundant or do not provide useful information. The present invention provides a mechanism for recovering the useful information from these alarms while minimizing the impact on processor real time and system resource usage.

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENT

Figure 1:
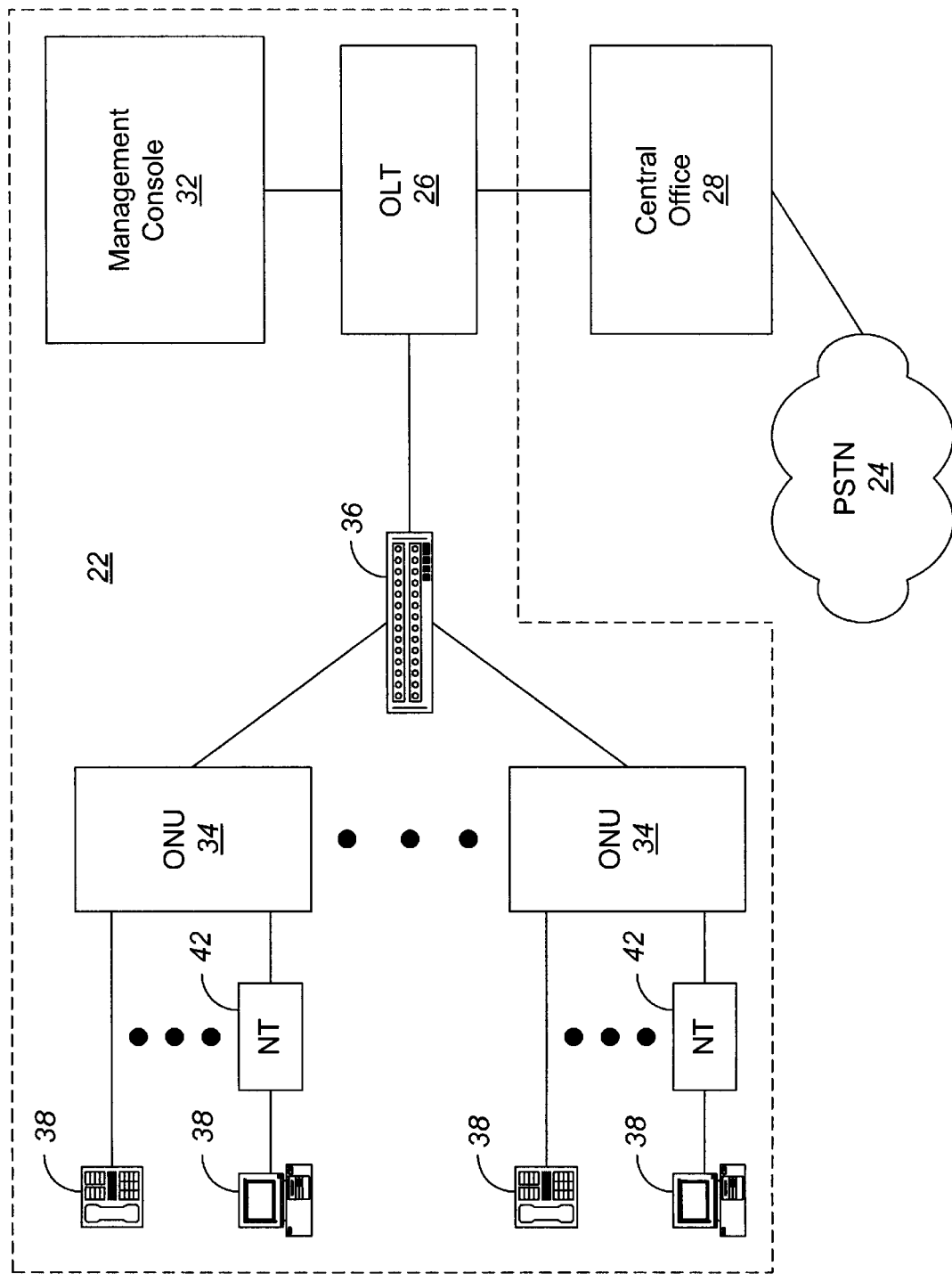
FIG. 1 depicts an access network including a management console responsible for processing alarms due to equipment and software module faults.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

The principles of the present invention will be described hereafter as applied to a communication network in general, and an access network in particular. It should be understood, however, that the present invention can be applied to any system incorporating a fault management subsystem that uses alarms or other similar identification mechanism for reporting faults and for determining when to take action in response to the faults.

With reference to FIG. 1, an access network 22 is shown that provides customers with access to the public switched telephone network 24. The access network 22 comprises an optical line terminator (OLT) 26 that provides an interface for the access network 22 to a central office 28. A management console 32 is in communication with the OLT that represents the processing unit for administering the access network 22. At the subscriber end, a plurality of optical network units (ONUs) 34—34 are connected to the OLT 26 through an optical multiplexer/demultiplexer. The ONUs provide an optical interface to customer premise equipment (CPE) 38—38 directly or through network termination (NT) devices 42—42.

Due to the tree-like structure of access network 22, a large number of components-including both hardware and software-fall under the supervision and control of a single management console 32. It is not uncommon to have over ten-thousand components in a single access network 22. Because of the numerosity of the types of components and their sources, the issue of alarm validation and filtering is of great importance in access networks 22.

Figure 2:
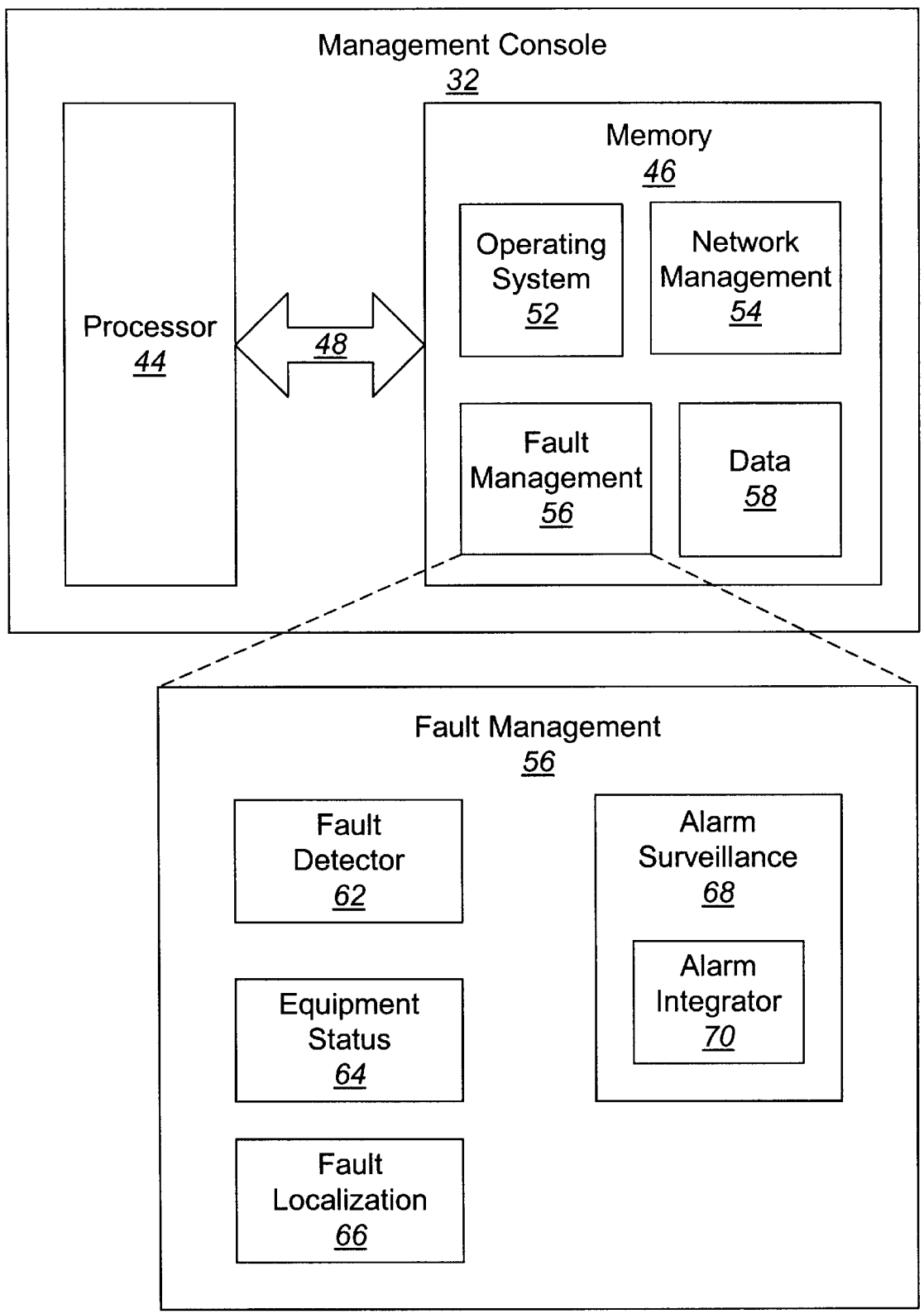
FIG. 2 provides a broad overview of the hardware and software architecture of the management console of FIG. 1 including the alarm integrator module, which provides control logic for filtering an alarm according to the present invention.

With reference to FIG. 2, a block diagram depicts the high level hardware and software architecture of management console 32. Management console 32 includes a processor 44, which communicates with a memory 46 via address/data bus 48. Processor 44 can be any commercially available or custom microprocessor suitable for use in a real-time application. Memory 46 is representative of the overall hierarchy of memory devices containing the software and data used to implement the functionality of management console 32. Memory 46 can include, but is not limited to, the following types of devices: cache, ROM, PROM, EPROM, EEPROM, flash, SRAM, and DRAM. As shown in FIG. 2, memory 46 holds four major categories of program code modules and data used in access network 22: the operating system 52; the network management program 54; the fault management program 56; and the data 58 used by the aforementioned programs.

The operating system 52 should be designed for real-time applications as the faults and alarms are processed by the management console 32 in real-time. The network management program 54 provides an operator interface and thereby conveys the occurrences of faults to the operator through the use of alarms. The fault management program 56 is responsible for the preservation and restoration of service in the presence of faults. And, finally, data 58 represents both static and dynamic data that are used by the program modules of management console 32.

The fault management code module 56 is shown to comprise several sub-modules corresponding to the various tasks involved in identifying and responding to faults in access network 22. Fault detector module 62 receives fault messages from various hardware and software components throughout access network 22 for processing by fault management module 56. These fault messages generally indicate a change in state (e.g., a change from a set state to a cleared state or vice versa). Equipment status module 64 tracks the service state (e.g., in service, out of service, under diagnostic test, etc.) of the components comprising access network 22. Fault localization module 66 comprises diagnostic test code that is used to pinpoint the root cause for a fault or to verify that a component is operational. Alarm surveillance module 68 collects the fault messages or reports from fault detector module 62 and controls the invocation and clearing of alarms in the system. In addition, the alarm surveillance module 68 includes the alarm integrator module 70, which provides a unique alarm validation and filtering scheme in accordance with the present invention. The operation of the alarm integrator module 70 will be described in more detail hereinafter.

Figure 3A:
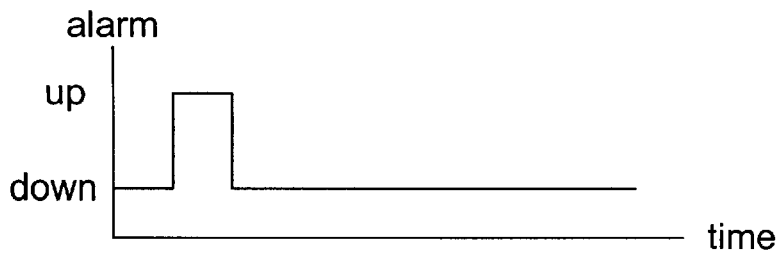
FIG. 3A depicts a first alarm input pattern.
Figure 3B:
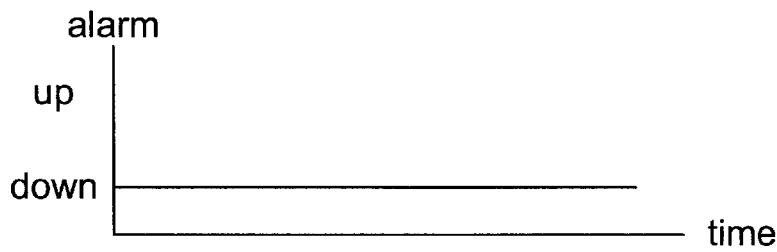
FIG. 3B depicts a first alarm output pattern that is produced by filtering or validating the first input pattern of FIG. 3A using a scheme known as alarm hold off.
Figure 4A:
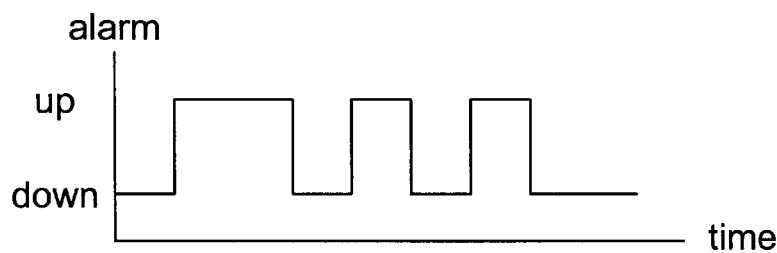
FIG. 4A depicts a second alarm input pattern.
Figure 4B:
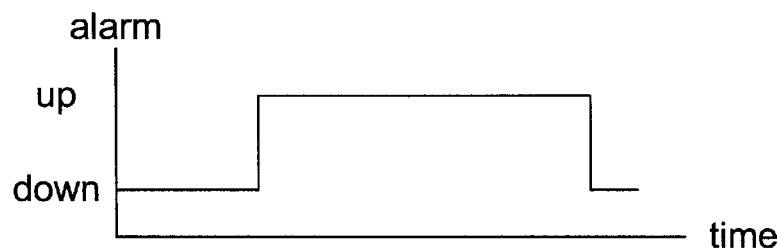
FIG. 4B depicts a second alarm output pattern that is produced by filtering or validating the second input pattern of FIG. 4A using the alarm hold off scheme.
Figure 5A:
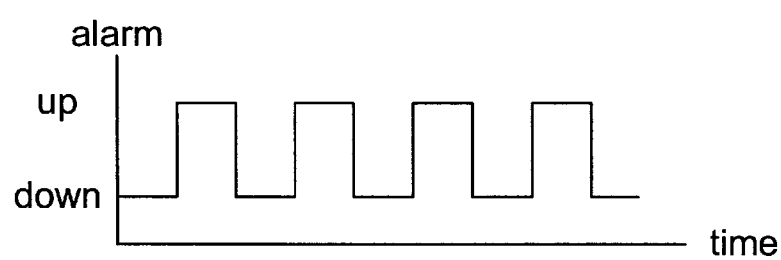
FIG. 5A depicts a third alarm input pattern.
Figure 5B:
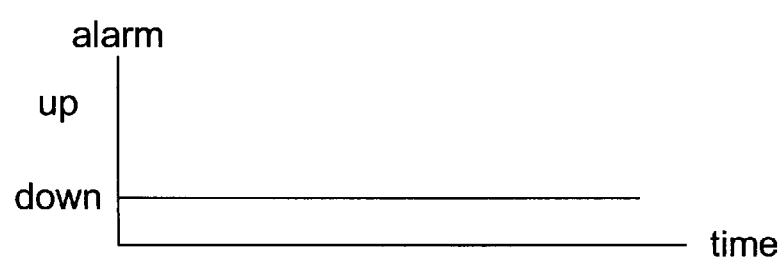
FIG. 5B depicts a third alarm output pattern that is produced by filtering or validating the third input pattern of FIG. 5A using the alarm hold off scheme.

Before describing the operation of alarm integrator module 70, however, it is helpful to review some alternative approaches to alarm validation and filtering that illustrate the basic principles involved. Referring now to FIGS. 3, 4, and 5, a scheme known as alarm hold off is illustrated. FIGS. 3A, 4A, and 5A depict various alarm patterns and FIGS. 3B, 4B, and 5B depict the result of validating these alarm patterns using alarm hold off. Alarm hold off is based on a simple principle: When a new fault condition or alarm state is reported, a timer is started corresponding to this particular fault. If the fault condition remains the same until the timer expires, the condition is validated and the alarm state is reported. If, however, the condition changes before the timer expires, the timer is canceled, the fault condition is not validated, and no change in alarm state is reported.

Consider the unvalidated alarm pattern of FIG. 3A, the initial transition from down to up results in the invocation of a timer for this state change. The unvalidated alarm, however, returns to the down state before the timer expires. Therefore, the transition from down to up is not validated as illustrated in the validated version of this alarm pattern shown in FIG. 3B. The second unvalidated alarm pattern shown in FIG. 4A involves a first transition of the unvalidated alarm from down to up, which again results in the invocation of a timer to validate this transition. In this case, the unvalidated alarm remains up until the timer expires and therefore the validated version of this alarm shown in FIG. 4B transitions from the down state to the up state. Although the unvalidated alarm toggles back and forth between the up and down states several times after the validated alarm has transitioned to the up state, these transitions have no effect on the state of the validated alarm because the unvalidated alarm never remains in the same state long enough for the transition to be validated by the expiration of the timer. Finally, FIG. 5A depicts an unvalidated alarm pattern comprising a series of transitions between the down and up states. Because the unvalidated alarm never remains in the up state long enough to allow the timer to expire, the validated alarm shown in FIG. 5B remains in the down state. Thus, the showering nature of the alarm pattern depicted in FIG. 5A is effectively filtered out from the validated alarm of FIG. 5B.

The validation sensitivity of the alarm hold off algorithm can be set by adjusting the timer expiration time. Longer timer expiration times result in fewer alarm transitions being reported while shorter expiration times result in the opposite effect. One major drawback to the alarm hold off approach is that the system must include a sufficient number of timers to respond to each state transition of an unvalidated alarm.

Figure 6A:
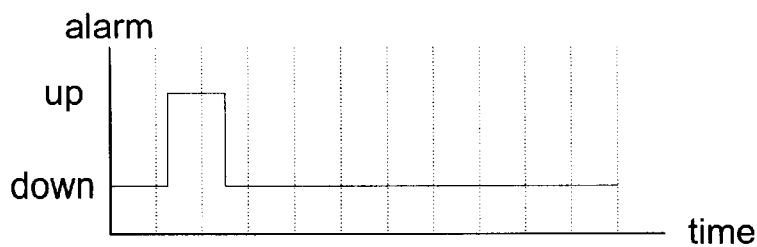
FIG. 6A depicts a first alarm input pattern.
Figure 6B:
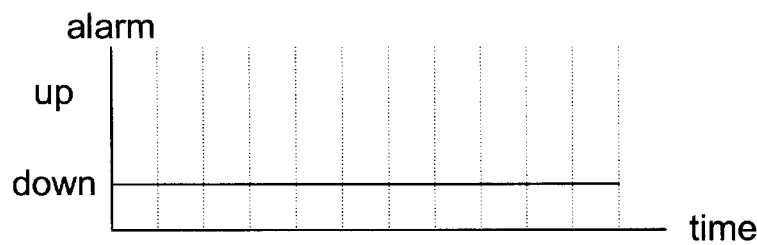
FIG. 6B depicts a first alarm output pattern that is produced by filtering or validating the first input pattern of FIG. 6A using a scheme known as alarm stretching.
Figure 7A:
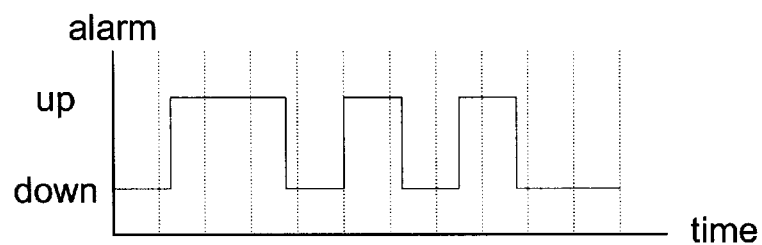
FIG. 7A depicts a second alarm input pattern.
Figure 7B:
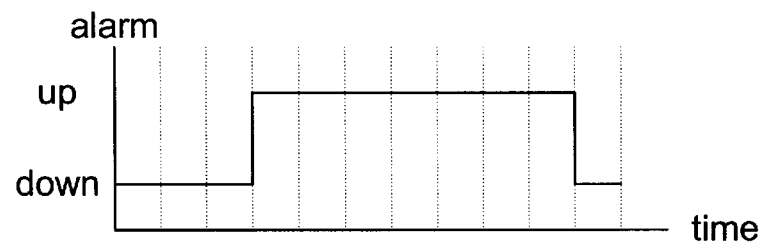
FIG. 7B depicts a second alarm output pattern that is produced by filtering or validating the second input pattern of FIG. 7A using the alarm stretching scheme.
Figure 8A:
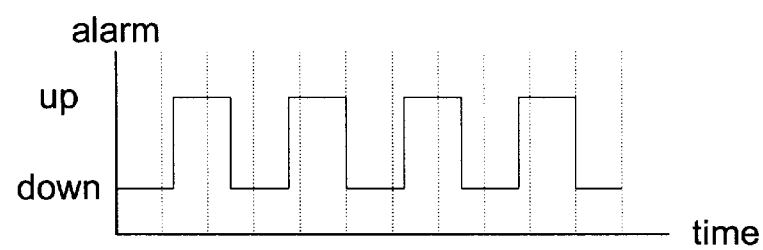
FIG. 8A depicts a third alarm input pattern.
Figure 8B:
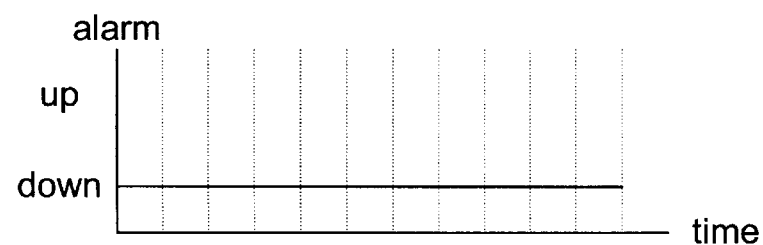
FIG. 8B depicts a third alarm output pattern that is produced by filtering or validating the third input pattern of FIG. 8A using the alarm stretching scheme.

An alternative alarm validation scheme that does not require a timer for every unvalidated alarm state transition is illustrated in FIGS. 6, 7, and 8 and is known as alarm stretching. This scheme is based on defining time slices, which are identified by the dashed lines in FIGS. 6 through 8. An unvalidated alarm state change is only validated or reported if the change is stable for a full time slice. For example, in FIG. 6A, the unvalidated alarm transitions from the down to the up state, but does not remain in the up state for a full time slice. Therefore, no state change is reported as indicated by the validated alarm of FIG. 6B. Conversely, in FIG. 7A, the unvalidated alarm transitions from down to up in the second time slice and remains in the up state throughout the entirety of the third time slice. Therefore, the validated alarm shown in FIG. 7B transitions from the down to the up state at the beginning of the fourth time slice. The validated alarm of FIG. 7B remains in the up state until the eleventh time slice because the unvalidated alarm of FIG. 7A never returned and remained in the down state for a full time slice until the tenth time slice. FIGS. 8A and 8B illustrate the response of the alarm stretching algorithm to a fast toggling unvalidated alarm that never remains in the same state for a full time slice. The validated alarm shown in FIG. 8B filters out the showering behavior of the unvalidated alarm. Nevertheless, the presence of a showering alarm may indicate a real fault in the system. Accordingly, it is possible to modify the alarm stretching algorithm by stretching only the clearing or the setting of the alarm.

Figure 9A:
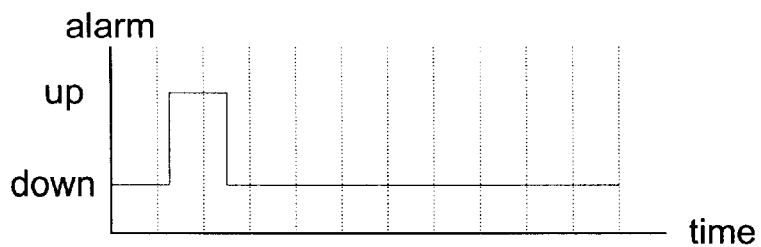
FIG. 9A depicts a first alarm input pattern.
Figure 9B:
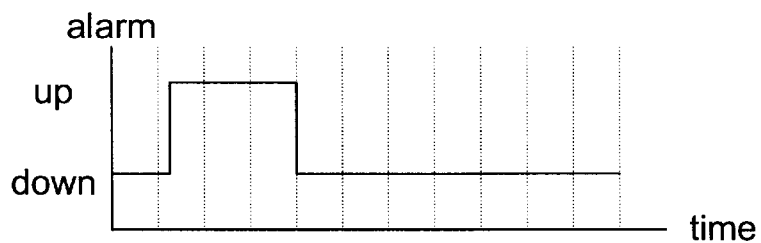
FIG. 9B depicts a first alarm output pattern that is produced by filtering or validating the first input pattern of FIG. 9A using a modified alarm stretching scheme.
Figure 10A:
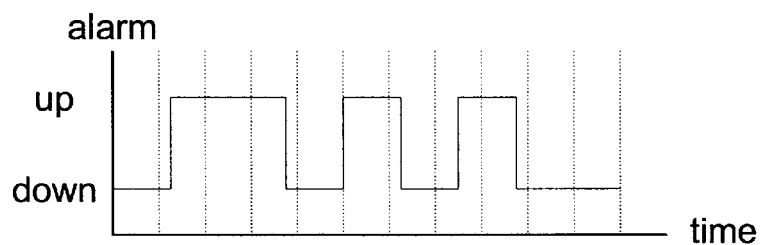
FIG. 10A depicts a second alarm input pattern.
Figure 10B:
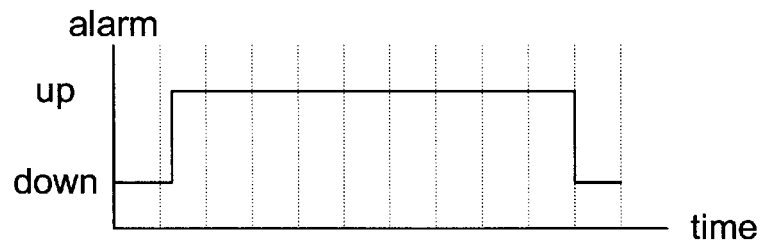
FIG. 10B depicts a second alarm output pattern that is produced by filtering or validating the second input pattern of FIG. 10A using the modified alarm stretching scheme.
Figure 11A:
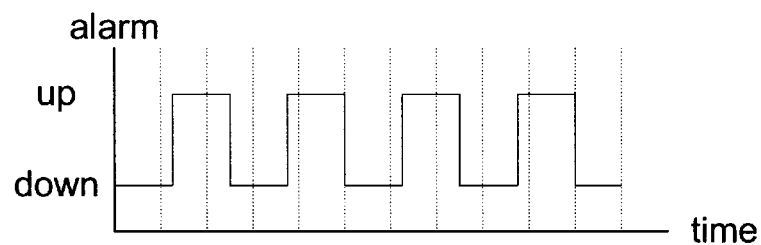
FIG. 11A depicts a third alarm input pattern.
Figure 11B:
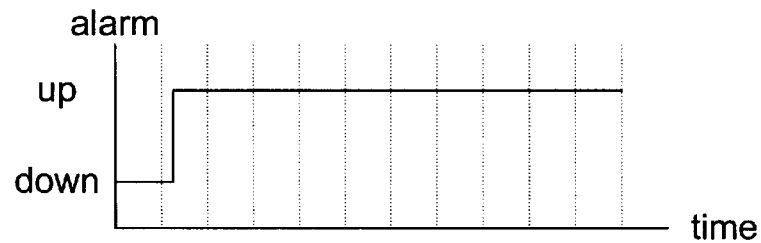
FIG. 11B depicts a third alarm output pattern that is produced by filtering or validating the third input pattern of FIG. 11A using the modified alarm stretching scheme.

An example of the alarm stretching algorithm in which only the clearing of the alarm is stretched is provided in FIGS. 9, 10, and 11. In this case, a transition of the unvalidated alarm from the down to the up state is immediately validated. Conversely, a transition from the up to the down state must remain stable for a complete time slice to be validated. Thus, as shown in FIGS. 9A and 9B, the unvalidated alarm transition from down to up in the second time slice is immediately validated as shown in FIG. 9B. The validated alarm of FIG. 9B remains in the up state until the unvalidated alarm returns and remains in the down state for a full time slice. Turning next to FIGS. 10A and 10B, the validated alarm of FIG. 10B transitions from the down to the up state during the second time slice in concert with the unvalidated alarm of FIG. 10A. The validated alarm of FIG. 10B remains in the up state until the eleventh time slice, however, because the unvalidated alarm of FIG. 10A never returns and remains in the down state until the tenth time slice. Finally, FIGS. 11A and 11B illustrate the response of the alarm stretching algorithm to a fast toggling alarm where only alarm clearing is stretched. In this example, the validated alarm of FIG. 11B follows the transition of the unvalidated alarm of FIG. 11A from down to up in the second time slice. The validated alarm, however, remains in the up state despite the transitions in the unvalidated alarm because the unvalidated alarm never returns and remains in the down state for a full time slice. Thus, whereas a fast-toggling alarm is completely filtered out (see FIG. 8B) when both the setting and clearing of the unvalidated alarm are stretched, the fast-toggling alarm is reported as a constant fault when only clearing of the unvalidated alarm is stretched (FIG. 11B).

An advantage of the alarm stretching algorithm is that only a single timer is required to define the time slices. Moreover, alarm stretching uses a simple algorithm for filtering or suppressing redundant alarm messages or alarm messages that do not require any maintenance attention. Nevertheless, the advantage of the alarm stretching algorithm is also its drawback. As illustrated in FIGS. 8A, 8B, 11A, and 11B, a fast toggling alarm is validated as no fault at all (FIG. 8B) or as a constant fault (FIG. 11B) depending on the particular variation of the alarm stretching algorithm that is used. Therefore, there remains a need for an alarm validation method that requires minimal resources while still being able to filter out as many redundant alarm messages as possible.

The operation of the alarm integrator module 70, which provides alarm validation in access network 22 in accordance with the principles of the present invention, will be described hereafter with frequent reference to (a) the flow charts of FIGS. 12A, 12B, and 12C; and (b) the alarm pattern diagrams of FIGS. 13 and 14.

For purposes of illustration, the behavior of the alarm integrator module 70 will be described by way of example with regard to the integration of a single alarm on a specific instance of hardware or software. In the preferred embodiment, the operating system 52 is multi-tasking and multiple alarms are integrated simultaneously. Furthermore, the term "integrate" is used interchangeably with the term "validate" in describing the operation of alarm integrator module 70. That is, to integrate or to validate an alarm refers to the process of filtering or suppressing redundant alarm transitions or alarm transitions that do not convey useful or necessary fault information.

Figure 12A:
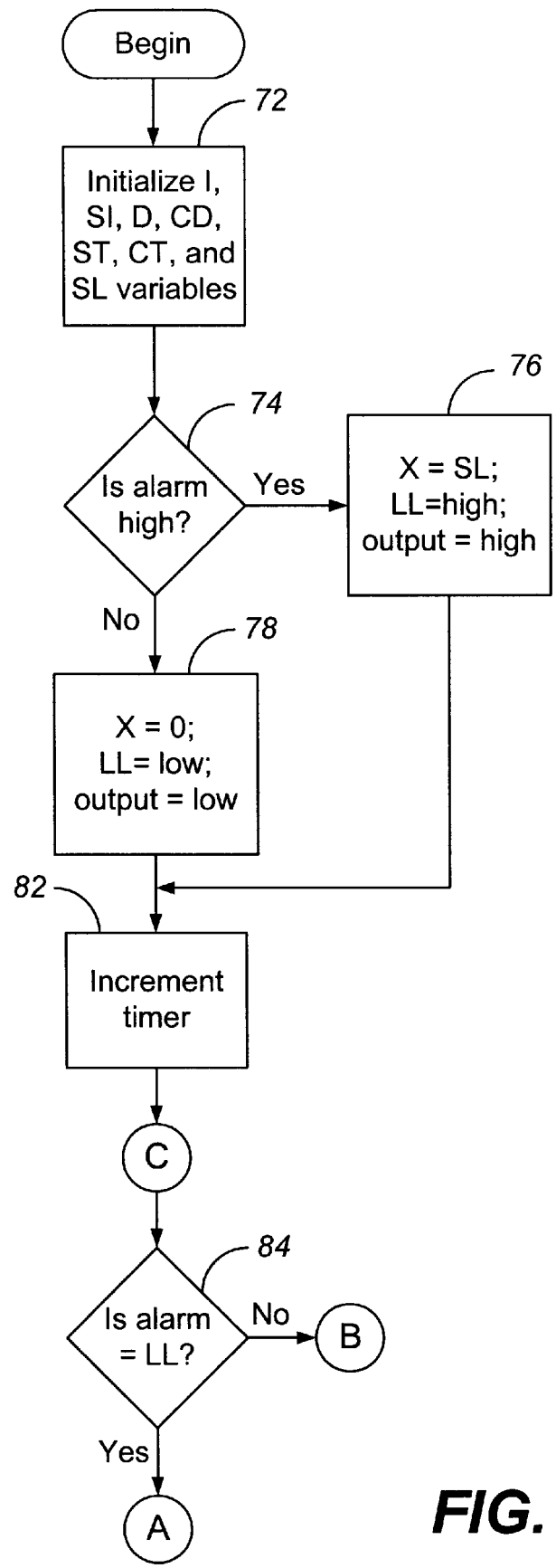
FIGS. 12A–12C are a flow chart that illustrate the operation of the alarm integrator module of FIG. 2.

With reference to FIG. 12A, the alarm integration process begins at step 72 by initializing seven variables, which are identified as follows: the increment variable (I), the setting increment variable (SI), the decrement variable (D), the clearing decrement variable (CD), the set threshold variable (ST), the clear threshold variable (CT), and the saturation level variable (SL). The absolute values assigned to these variables are not important, however, the following relationships should be maintained: I, SI, D, and DI should all be less than or equal to SL; and ST should be greater than or equal to CT.

Figure 13:
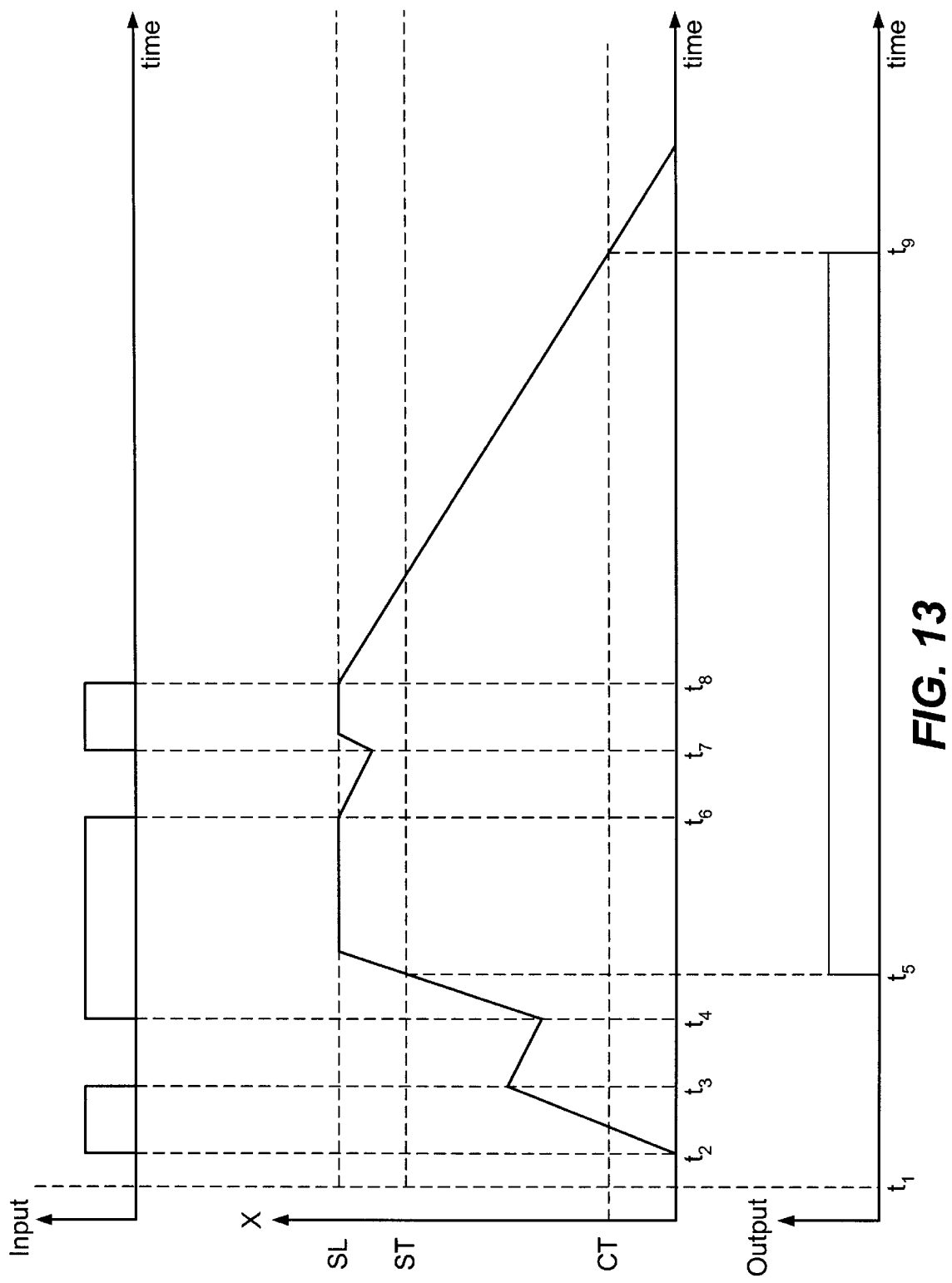
FIG. 13 depicts an input alarm pattern, a filtered or validated output alarm pattern, and a graph of the integration variable used by the alarm integrator module of FIG. 2 in producing the output alarm pattern from the input alarm pattern.

Referring now to FIG. 13, an input or unvalidated alarm pattern is shown comprising two states-a high state and a low state. Thus, the output alarm pattern which corresponds to the integrated or validated alarm pattern also comprises both a high state and a low state. The alarm integration process implemented by the alarm integrator module 70 can be used to integrate alarms comprising more than two states, but, for clarity of exposition, the integration of a two state alarm will be described herein.

Returning to FIG. 12A, alarm integration module 70 determines at decision diamond 74 whether the input alarm is initially in the high state or low state. If the input alarm is high, an integration variable X is set to the SL value, a last look variable LL is set to the high state, and the output or integrated alarm is set to the high state in step 76. The value of the integration variable X over time is shown in FIG. 13 between the input and output alarm patterns. Conversely, if the input alarm is low, the integration variable X is set to zero, LL is set to the low state, and the output alarm is set to the low state in step 78. Once the initialization is complete with either step 76 or step 78, the timer is incremented in step 82. In the example shown in FIG. 13, the input alarm pattern is low at time $t_1$; therefore, step 78 will be executed and the output alarm is set to the low state.

At decision diamond 84, alarm integration module 70 compares the current state of the input alarm with the state of the last look variable LL. If the input alarm has not changed states, the process continues by following termination A, otherwise, termination B is followed.

Figure 12B:
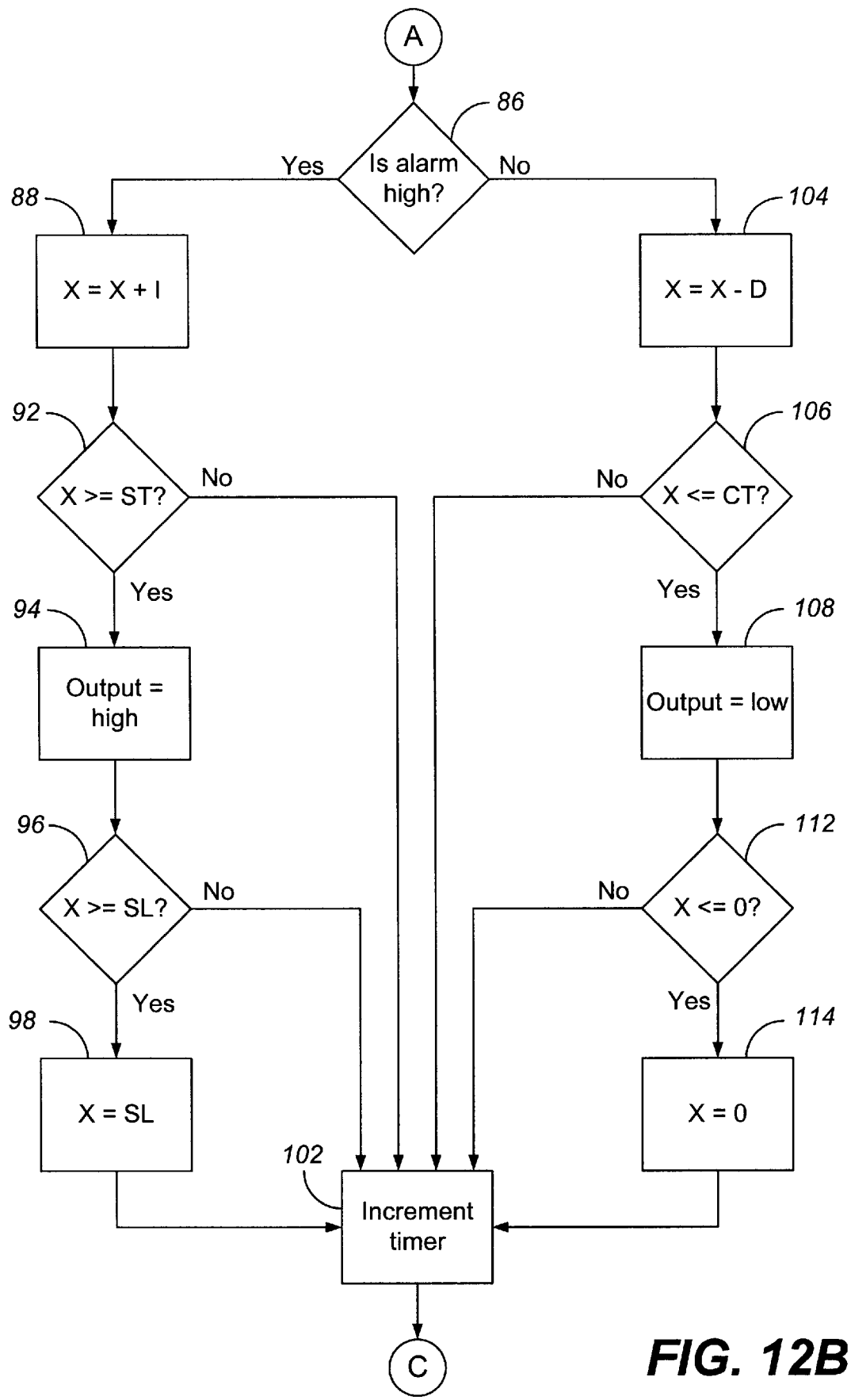

Following termination A to FIG. 12B, a determination is made at decision diamond 86 whether the input alarm is in the high state. If the input alarm is currently high, the integration variable X is incremented by I in step 88. At decision diamond 92, the value of the integration variable X is compared to the ST variable. Once the integration variable X reaches or exceeds the value of the ST variable, the output alarm is set to the high state in step 94. This takes place at time $t_5$ in the example shown in FIG. 13. The integration variable X, however, is compared to the SL variable at decision diamond 96 to ensure that the integration variable has not exceeded the SL value. If the integration variable X has exceeded the SL value, X is reset to equal the value of SL in step 98. After the integration variable X has been set to the SL value or if X is less than either the ST or SL variables, the timer is incremented in step 102 and the process returns to decision diamond 84 by following termination C.

If it is determined at decision diamond 86 that the input alarm is currently low, the integration variable X is decremented by D in step 104. At decision diamond 106, the value of the integration variable X is compared to the CT variable. Once the integration variable X reaches or falls below the value of the CT variable, the output alarm is set to the low state in step 108. This takes place at time $t_9$ in the example shown in FIG. 13. The integration variable X, however, is compared to zero (or other chosen value corresponding to the low state from step 78) at decision diamond 112 to ensure that the integration variable has not fallen below zero. If the integration variable X has fallen below zero, X is reset to zero in step 114. After the integration variable X has been set to zero or if X is greater than either the CT variable or zero, the timer is incremented in step 102 and the process returns to decision diamond 84 by following termination C.

Figure 12C:
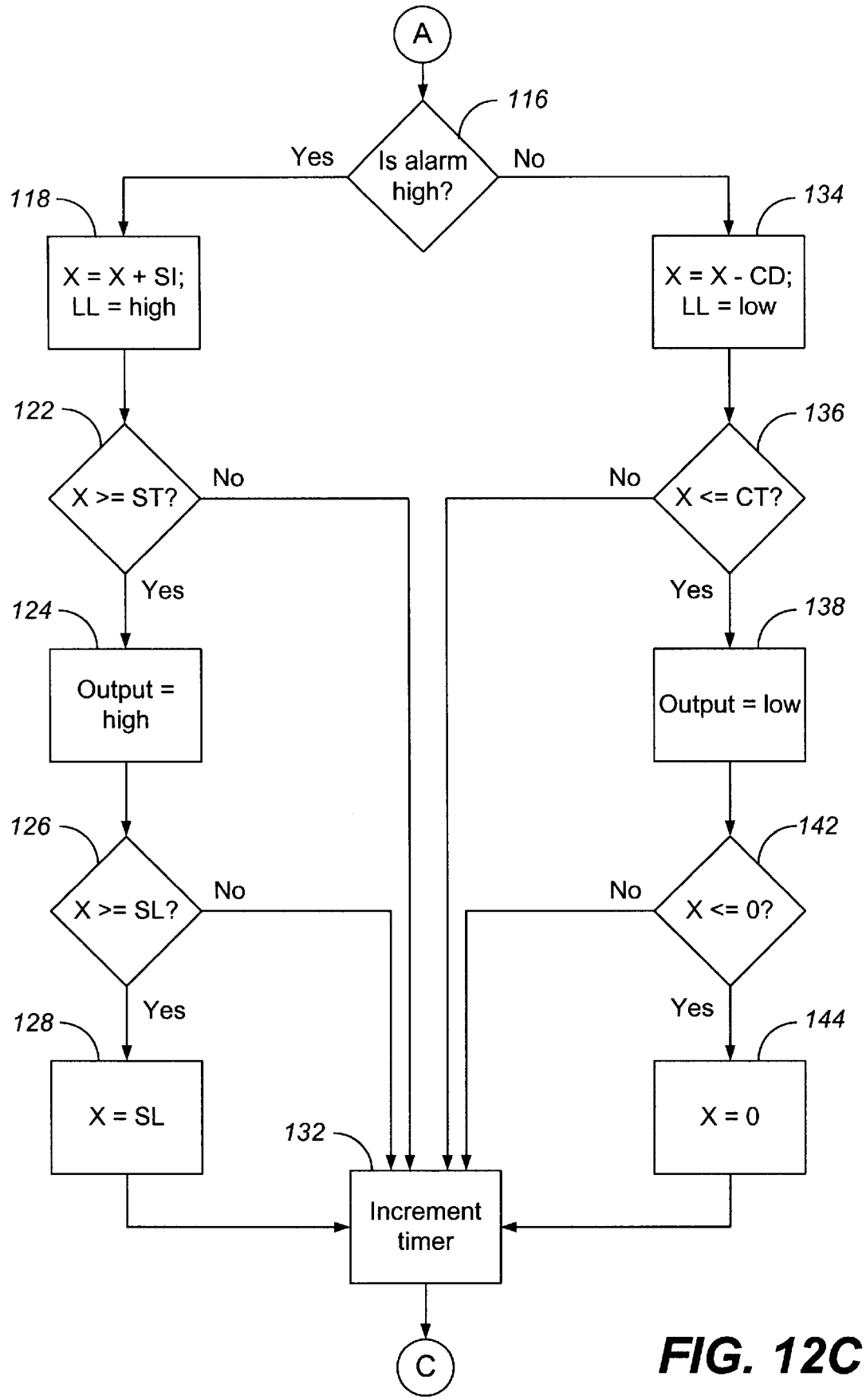

If the input alarm has undergone a state change as determined at decision diamond 84 (FIG. 12A), the alarm integration process follows termination B to FIG. 12C. If it is determined at decision diamond 116 that the input alarm is currently high, a transition from the low state to the high state has occurred. This is shown in FIG. 13 at times $t_2$, $t_4$, and $t_7$. Under this circumstance, the integration variable X is incremented by SI in step 118 and the last look variable LL is set to the high state. At decision diamond 122, the value of the integration variable X is compared to the ST variable. Once the integration variable X reaches or exceeds the value of the ST variable, the output alarm is set to the high state in step 124. This takes place at time $t_5$ in the example shown in FIG. 13. The integration variable X, however, is compared to the SL variable at decision diamond 126 to ensure that the integration variable has not exceeded the SL value. If the integration variable X has exceeded the SL value, X is reset to the value of SL in step 128. After the integration variable X has been set to the SL value or if X is less than either the ST or SL variables, the timer is incremented in step 132 and the process returns to decision diamond 84 by following termination C.

If it is determined at decision diamond 116 that the input alarm is currently low, a transition from the high state to the low state has occurred. This is shown in FIG. 13 at times $t_3$, $t_6$, and $t_8$. Under this circumstance, the integration variable X is decremented by CD in step 134 and the last look variable LL is set to the low state. At decision diamond 136, the value of the integration variable X is compared to the CT variable. Once the integration variable X reaches or falls below the value of the CT variable, the output alarm is set to the low state in step 138. This takes place at time $t_9$ in the example shown in FIG. 13. The integration variable X, however, is compared to zero (or other chosen value corresponding to the low state from step 78) at decision diamond 142 to ensure that the integration variable has not fallen below zero. If the integration variable X has fallen below zero, X is reset to zero in step 144. After the integration variable X has been set to zero or if X is greater than either the CT variable or zero, the timer is incremented in step 132 and the process returns to decision diamond 84 by following termination C.

Figure 14:
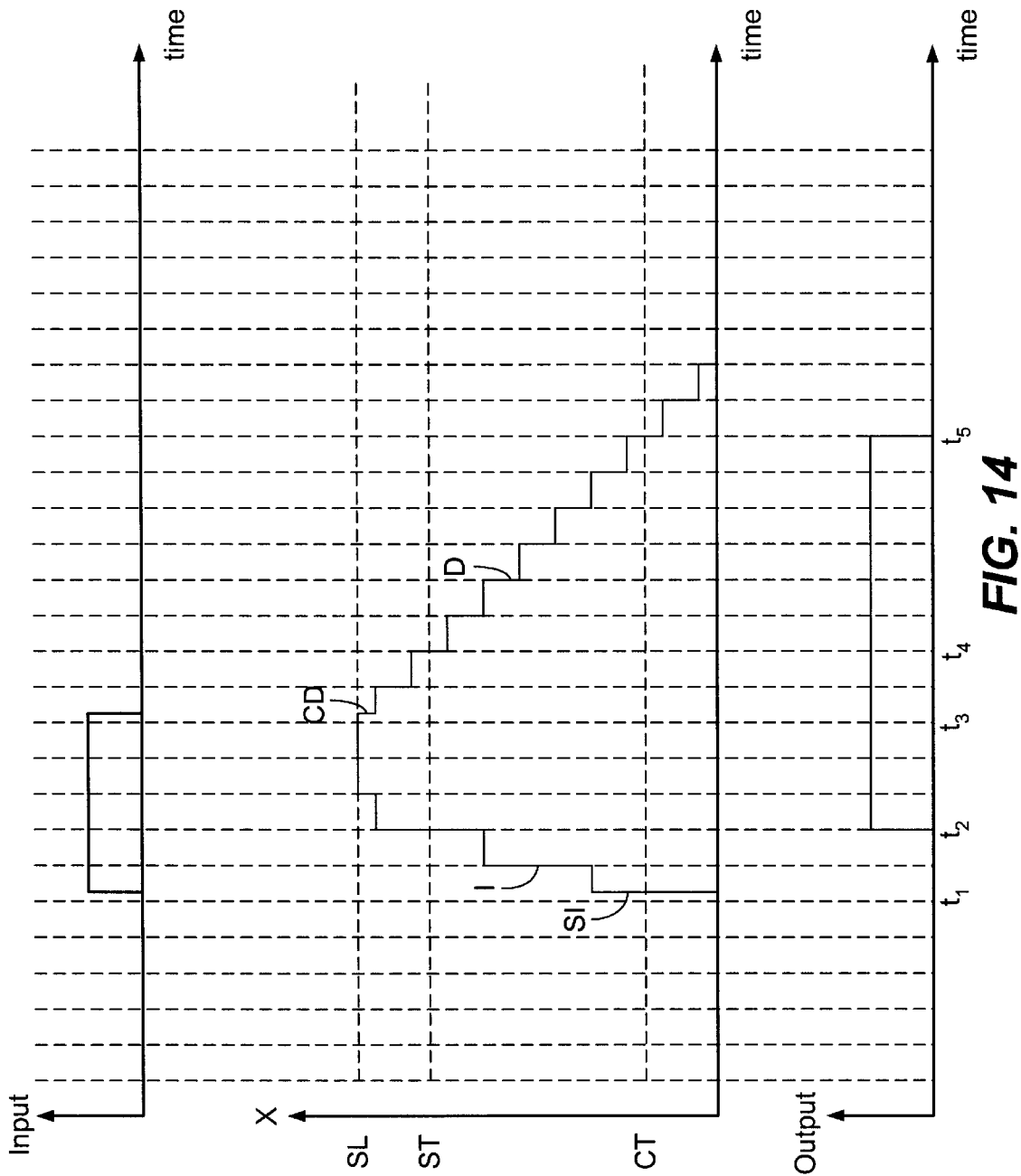
FIG. 14 provides a detailed view of an input alarm pattern, a filtered or validated output alarm pattern, and a graph of the integration variable used by the alarm integrator module of FIG. 2 in producing the output alarm pattern from the input alarm pattern.

FIG. 14 provides a more detailed view of the alarm integration process that illustrates the relationship between the variables used by alarm integration module 70. At just past time $t_1$, the input alarm makes a transition from the low state to the high state. Because the input alarm had been in the low state since initialization, the integration variable X was set to zero. Thus, upon notification of the transition from low to high by fault detector module 62, alarm integration module 70 increments the integration variable X by the value of SI. The input alarm remains in the high state which causes the integration variable X to rise by the value of I at each clock increment. At time $t_2$, the integration variable X exceeds the ST value thereby causing the output alarm to transition from the low state to the high state. The input alarm remains in the high state, which causes the integration variable to reach the SL value. The integration variable X is not allowed to exceed the SL value even though the input alarm remains in the high state.

At just past time $t_3$, the input alarm makes a transition from the high state to the low state, which is detected by fault detector module 62. Upon notification of the transition from high to low by fault detector module 62, alarm integration module 70 decrements the integration variable X by the value of CD. The input alarm remains in the low state which causes the integration variable X to fall by the value of D at each clock increment. At time $t_5$, the integration variable X falls below the CT value thereby causing the output alarm to transition from the high state to the low state. The input alarm remains in the low state, which causes the integration variable to reach zero. The integration variable X is not allowed to fall below zero even though the input alarm remains in the high state.

As illustrated in FIGS. 13 and 14 and described with reference to the flow charts of FIGS. 12A, 12B and 12C, the alarm integration process uses hysteresis to validate alarm transitions. That is, the ST and the CT variables define hysteresis levels that control when a particular state transition will be validated and incorporated into the output alarm pattern. For the case of a two state alarm, the alarm integration process introduces a minimum delay of (ST–SI)/I timer increments in setting the output alarm to the high state and a minimum delay of (SL–CT+CD)/D in clearing the output alarm to the low state.

In the preferred embodiment of the present invention, the value assigned to SI is greater than the value assigned to CD. This allows the alarm integration module 70 to better handle the situation of a fast-toggling or showering input alarm as shown in FIGS. 5A and 8A. A fast-toggling input alarm will cause the integration variable X to be alternately incremented by the value of SI and then decremented by the value of CD. If the values of SI and CD are equal, and the integration variable X is currently below the value of ST, the output alarm will never be set to the high state to report the existence of a fault. Conversely, if SI is greater than CD, the integration variable X will slowly climb at a rate of (SI–CD)/2 per time increment thus allowing the integration variable X to eventually reach the level of ST, which will cause the output alarm to be set high.

The operation of the alarm integration module 70 was described by way of example in which the integrated alarm comprised only two states. The principles of the present invention disclosed herein, however, can be applied to generate an integrated alarm wherein the number of possible output states N is greater than two. Transitions between the output states are controlled by N–1 pairs of ST and CT variables.

Advantageously, the alarm integration process according to the present invention is very resource efficient. For example, a single timer can be used for all alarms to be integrated by alarm integration module 70. This timer can be implemented by either a hardware or software clock. This is a critical feature for systems that may contain thousands of alarms as it would be impractical to dedicate a timer to each alarm to be integrated.

If the system has many alarms of the same type, it is beneficial to use the same set of variables (i.e., I, SI, D, CD, ST, CT, and SL) for each of them. This can result in significant memory savings especially if the system contains thousands of alarms. Furthermore, the SL variable can be made common for all alarms as it can be scaled by the alarm integration module 70 to adapt to the variable requirements for a particular alarm. If SL is the same for all alarms, it can be eliminated as a variable and implemented instead as part of data 58 as an element of static data. Finally, the integration variable X can be stored as dynamic data that is created only when there has been a transition that would cause the integration variable to change from the zero value or the SL value. This not only reduces memory usage but also reduces processor time as fewer integration variables $X_i$ need to be updated at each increment of the timer. It is envisioned that the management console could include a database update system that allows technicians or craft personnel to enter values for the variables used in the alarm integration process to ensure that their system performs optimally based on historical failure patterns.

As mentioned earlier, the alarm integration process of the present invention uses hysteresis to validate an input alarm pattern. This, however, will result in delays before the output or validated alarm reports a fault or indicates that a fault has been cleared or resolved. For example, suppose a line card in an ONU 34 reports a hardware fault, which is integrated and reported to a technician via the management console 32. If the technician replaces the faulty card with a working card or simply removes the faulty card from service, there will be some delay before the fault condition is cleared in the validated alarm. Thus, the fault management module 56 preferably includes a mechanism for resetting the alarm integration process for an alarm whose underlying hardware or software component has undergone maintenance.

Similarly, if a particular hardware or software component is very critical to the operation of the system (e.g., access network 22), it may be desirable to invoke a diagnostic test suite or provide an alarm notification at the first instance of any fault. Because the alarm integration process of the present invention will introduce a delay in reporting the alarm in the validated output, the fault management module should trigger any diagnostic action or alarm notification based on the unvalidated input alarm rather than the output of the alarm integration module 70.

The flow charts of FIGS. 12A, 12B, and 12C show the architecture, functionality, and operation of a possible implementation of the alarm integrator module 70 program. In this regard, each block represents a module, segment, or portion of code, which comprises one or more executable instructions for implementing the specified logical function (s). It should also be noted that in some alternative implementations, the functions noted in the blocks may occur out of the order noted in FIGS. 12A, 12B, and 12C. For example, two blocks shown in succession may in fact be executed substantially concurrently or the blocks may sometimes be executed in the reverse order, depending upon the functionality involved and the particular implementation of the program.

Moreover, the alarm integrator module 70 program logic of the present invention can be implemented in hardware, software, firmware, or a combination thereof In the preferred embodiment, the alarm integrator module 70 programs are implemented in software or firmware that is stored in a memory and that is executed by a suitable instruction execution system.

The alarm integrator module 70 programs, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from an instruction storage system, apparatus, or device and execute the instructions. In the context of this document, a "computer-readable medium" can be any means that can contain, store, communicate, propagate, or transport the programs for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

We claim:

1. A method for filtering a first alarm having a first plurality of states, wherein said first alarm is in a state of said first plurality of states, comprising the steps of:

repeatedly determining said state of said first alarm to form a first pattern of state transitions for said first alarm; and integrating said first pattern of state transitions to produce a second pattern of state transitions for a second alarm, said second alarm having a second plurality of states, said integrating step comprising the step of:

using a pair of hysteresis threshold values for controlling transitions between said second plurality of states;

adjusting an integration value based on said first alarm state;

comparing said integration value with said pair of hysteresis threshold values; and defining a first range of values for said integration value such that said adjusting step is limited to values within said first range, wherein said first range of values includes said pair of hysteresis threshold values, and wherein a second range of values defined by said pair or hysteresis threshold values is smaller than said first range of values.

2. The method of claim 1, wherein said adjusting step further comprises the steps of:

incrementing said integration value by a first amount based upon said first alarm state; and decrementing said integration value by a second amount based upon said first alarm state.

3. The method of claim 1, wherein a first said threshold value controls transitions in said second alarm from a first said state to a second said state and a second said threshold value controls transitions in said second alarm from said second state to said first state.

4. The method of claim 1, wherein said integrating step further comprises the steps of:

defining a plurality of time intervals; and repeating said determining and said adjusting steps upon expiration of each said time interval.

5. A method for filtering a first alarm having a first plurality of states to produce a second alarm having a second plurality of states, wherein said first alarm is in a state of said first plurality of states, comprising the steps of:

determining said state of said first alarm;

adjusting an integration value based on said first alarm state;

comparing said integration value with a pair of hysteresis threshold values;

defining a first range of values for said integration value such that said adjusting step is limited to values within said first range, wherein said first range of values includes said pair of hysteresis threshold values, and wherein a second range of values defined by said pair of hysteresis threshold values is smaller than said first range of values; and updating said second alarm state according to the results of said comparing step.

6. The method of claim 5, wherein said adjusting step further comprises the steps of:

incrementing said integration value by a first amount based upon said first alarm state; and decrementing said integration value by a second amount based upon said first alarm state.

7. The method of claim 5, wherein said comparing step comprises:

comparing said integration variable with a first said threshold value for determining whether to cause a transition in said second alarm from a first said state to a second said state; and comparing said integration variable with a second said threshold value for determining whether to cause a transition in said second alarm from said second state to said first state.

8. An alarm management system, comprising:

a processor;

a storage medium in communication with said processor;

said storage medium having program code for filtering a first alarm having a first plurality of states, wherein said first alarm is in a state of said first plurality of states, said program code comprising:

first code segment to repeatedly determine said state of said first alarm to form a first pattern of state transitions for said first alarm; and second code segment to intergrate said first pattern of state transitions to produce a second pattern of state transitions for a second alarm, said second alarm having a second plurality of states, said second code segment including a third code segment for using a pair of hysteresis threshold values to control transitions between said second plurality of states; and a fourth code segment to define a first range of values for said integration value, wherein said first range of values includes said pair of hysteresis threshold values, and wherein a second range of values defined by said pair of hysteresis threshold values is smaller than said first range of values.

9. The system of claim 8, wherein said second code segment further comprises:

a fifth code segment for adjusting an integration value based on said first alarm state; and a sixth code segment for comparing said integration value with said pair of hysteresis threshold values.

10. The system of claim 9, wherein a first said threshold value controls transitions in said second alarm from a first said state to a second said state and a second said threshold value controls transitions in said second alarm from said second state to said first state.

11. The system of claim 9, wherein said fifth code segment further includes:

a seventh code segment for incrementing said integration value by a first amount based upon said first alarm state; and an eighth code segment for decrementing said integration value by a second amount based upon said first alarm state.

12. A computer readable medium having a program for filtering a first alarm having a first plurality of states, wherein said first alarm is in a state of said first plurality of states, comprising:

a first code segment to repeatedly determine said state of said first alarm to form a first pattern of state transitions for said first alarm; and a second code segment to integrate said first pattern of state transitions to produce a second pattern of state transitions for a second alarm, said second alarm having a second plurality of states, said second code segment to integrate comprising:

a third code segment to use a pair of hysteresis threshold values for controlling transitions between said second plurality of states; and a fourth code segment to define a first range of values for said integration value, wherein said first range of values includes said pair of hysteresis threshold values, and wherein a second range of values defined by said pair of hysteresis threshold values is smaller than said first range of values.

13. The computer readable medium of claim 12, wherein said second code segment to integrate further comprises:

a fifth code segment to adjust an integration value based on said first alarm state; and a sixth code segment to compare said integration value with said pair of hysteresis threshold values.

14. The computer readable medium of claim 13, wherein said fifth code segment further includes:

a seventh code segment for incrementing said integration value by a first amount based upon said first alarm state; and an eighth code segment for decrementing said integration value by a second amount based upon said first alarm state.

* * * * *